No. 635,466. Patented Oct. 24, 1899.
A. DARLING.
KINETOGRAPHIC CAMERA.
(Application filed Mar. 6, 1899.)

(No Model.) 4 Sheets—Sheet 1.

Witnesses Inventor

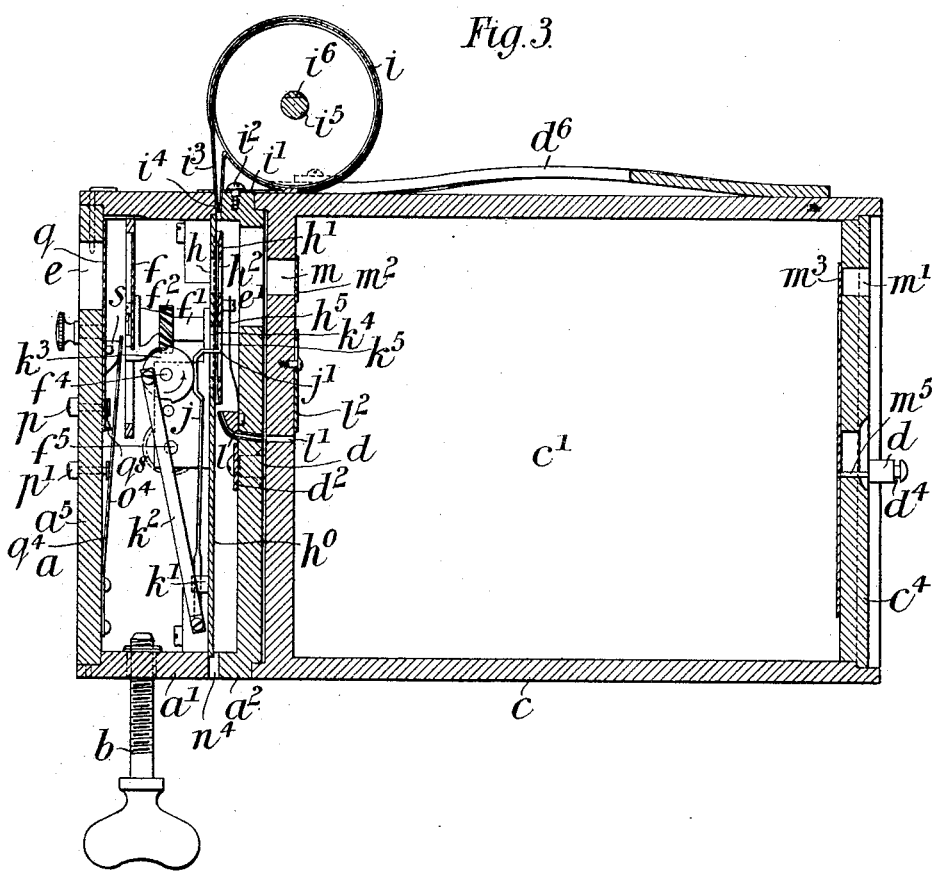
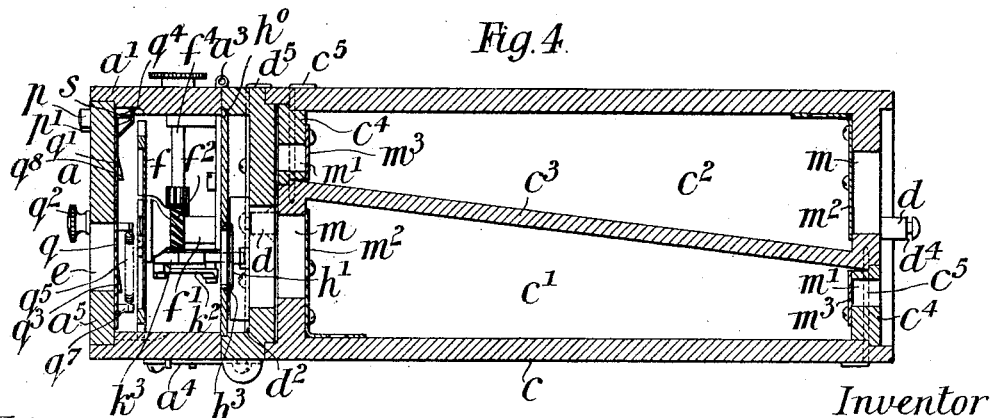

No. 635,466. Patented Oct. 24, 1899.
A. DARLING.
KINETOGRAPHIC CAMERA.
(Application filed Mar. 6, 1899.)
(No Model.) 4 Sheets—Sheet 3.
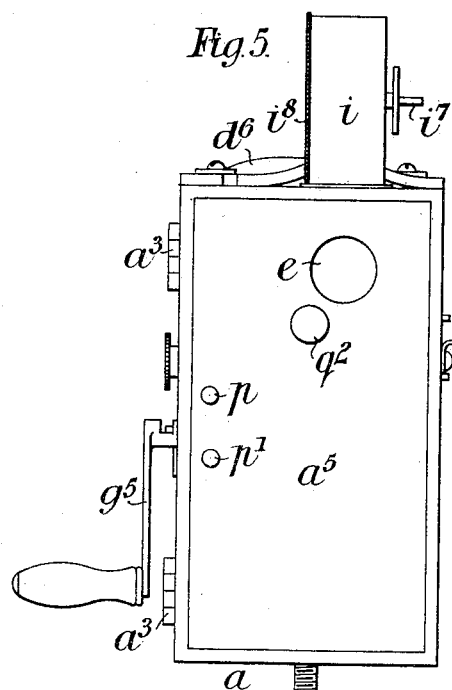
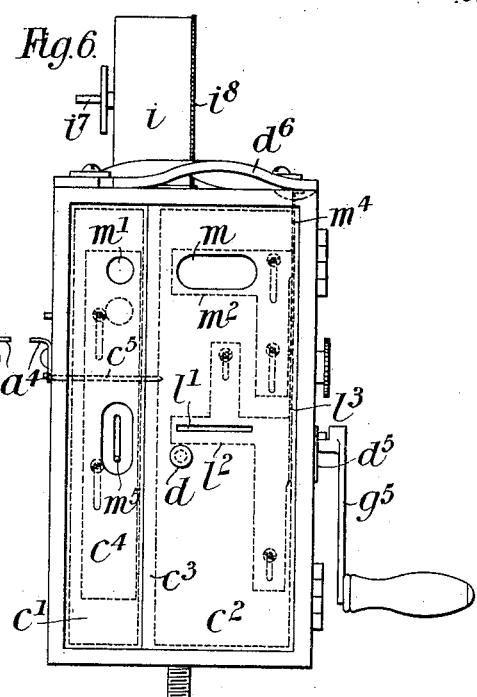
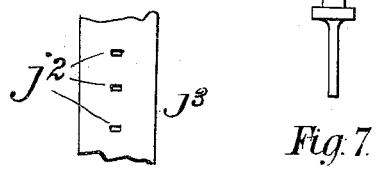
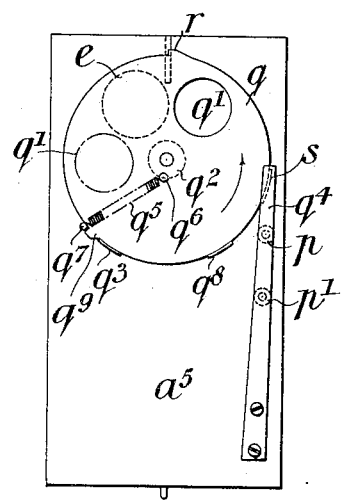
Witnesses
John E. Dousfield.
C. G. Redfern.
Inventor
A. Darling No. 635,466. Patented Oct. 24, 1899.
A. DARLING.
KINETOGRAPHIC CAMERA.
(Application filed Mar. 6, 1899.)
(No Model.) 4 Sheets—Sheet 4.
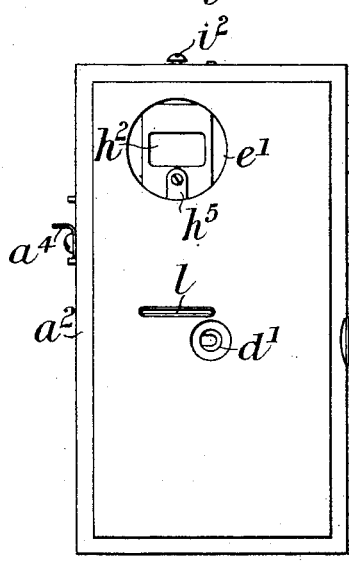
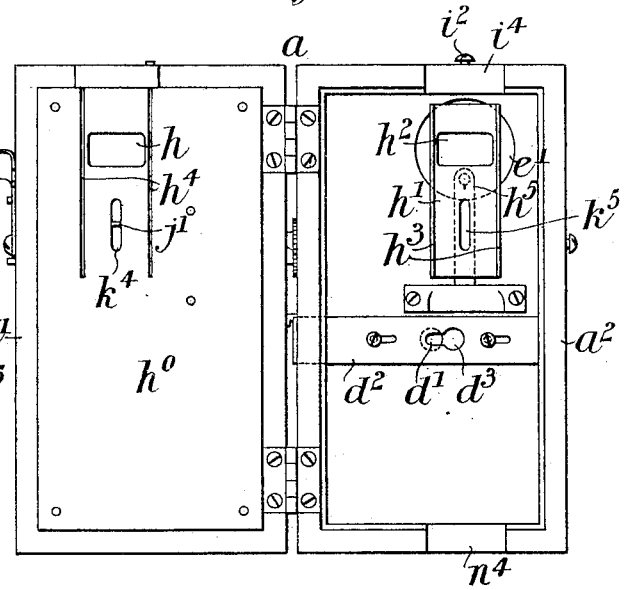
Witnesses.
John E. Bousfield.
C. G. Redfern
Inventor
A. Darling

UNITED STATES PATENT OFFICE.

ALFRED DARLING, OF BRIGHTON, ENGLAND, ASSIGNOR OF ONE-HALF TO ALFRED WRENCH, OF LONDON, ENGLAND.

KINETOGRAPHIC CAMERA.

SPECIFICATION forming part of Letters Patent No. 635,466, dated October 24, 1899.

Application filed March 6, 1899. Serial No. 707,974. (No model.)

*To all whom it may concern:*

Be it known that I, ALFRED DARLING, a subject of the Queen of Great Britain, residing at Brighton, England, have invented a new and useful Improved Camera for Producing Kinematograph and other Pictures, of which the following is a specification.

My invention relates to improved apparatus for producing a series of photographic negatives upon a film-band, the said apparatus being also applicable for producing ordinary photographic negatives.

Figure 1:
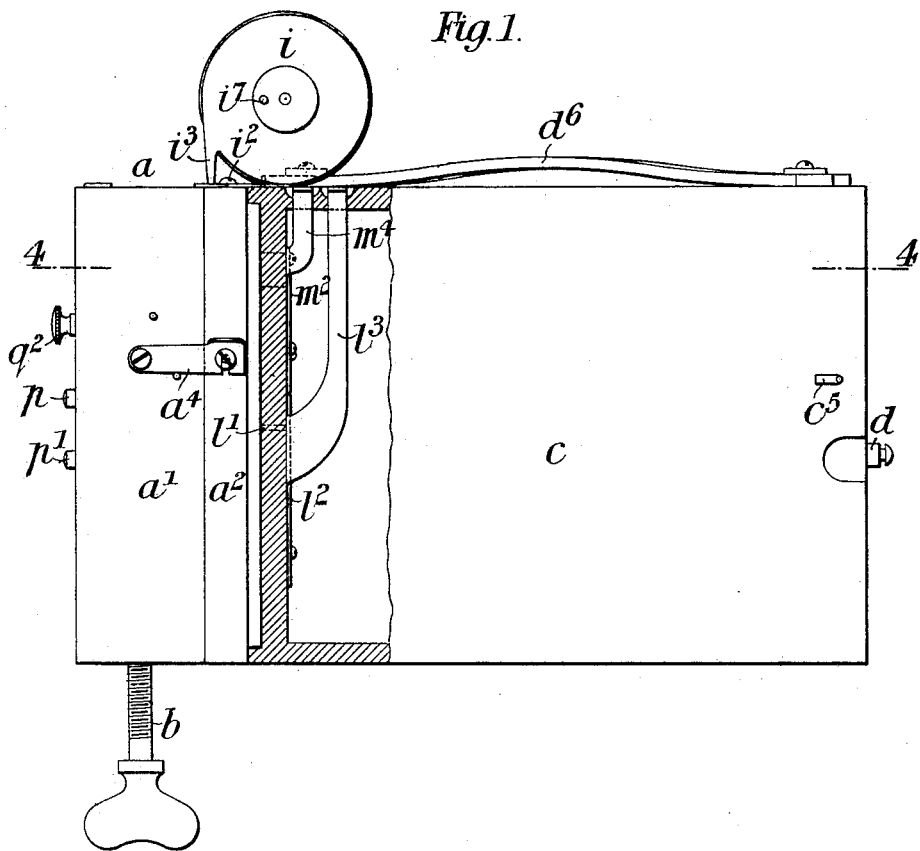
Figure 2:
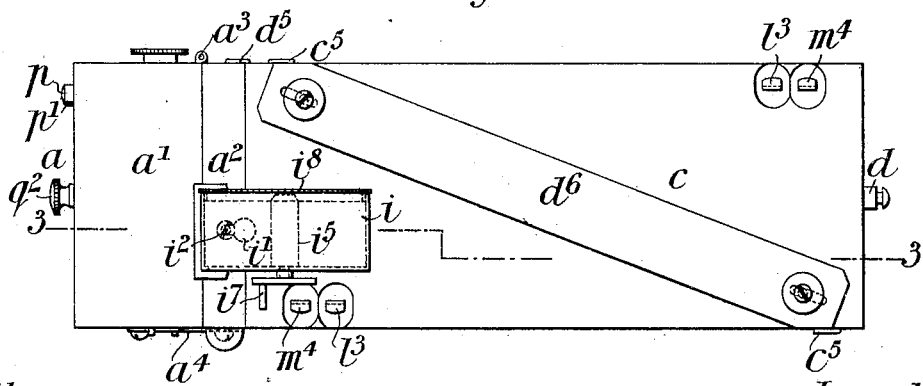

In the accompanying drawings, Figure 1 is a sectional side elevation of the improved apparatus as adapted for taking photographic pictures. Fig. 2 is a plan of the same. Fig. 3 is a longitudinal vertical section on the line 3 3 of Fig. 2, and Fig. 4 is a longitudinal horizontal section on the line 4 4 of Fig. 1. Fig. 5 is a front elevation, and Fig. 6 a rear elevation, of the same. Fig. 7 is a front elevation with the front plate removed in order to reveal the shutter and feed mechanism; and Fig. 8 is a view of the rear side of the said plate, showing a shutter for use in taking single pictures. Fig. 9 is a rear view with the dark chamber removed, and Fig. 10 is an elevation showing the front and rear parts of the box or camera opened on their hinges so as to reveal the film-guide and feed mechanism. Fig. 11 is an elevation of a portion of a film-band.

Similar letters of reference indicate corresponding parts in the several figures.

$a$ is a box containing the shutters and feed mechanism and which for convenience of description is hereinafter referred to as the "camera," the said box being made in two parts $a'$ $a^2$, connected by hinges $a^3$ and adapted to be held together by a pivoted catch $a^4$. The part $a'$ of the said box is provided on the under side with a screw $b$, by means of which it may be detachably connected to a suitable stand or support.

$c$ is a dark chamber divided into two compartments $c'$ $c^2$ by a partition $c^3$, the said chamber being so constructed at its ends that either end may be placed against the rear side of the camera $a$, as shown in Fig. 3. Each compartment has a removable end or cover $c^4$, held in place by a pin $c^5$. Any suitable means may be provided for attaching the said dark chamber to the camera. As shown in Figs. 3 and 4, the said dark chamber has at each end a stud $d$, designed to enter a corresponding hole $d'$ in the part $a^2$ of the camera and to be held therein by means of a sliding plate $d^2$, Figs. 3, 4, and 10, the said sliding plate having in it a hole $d^3$, which passes over the head of the stud and which has a slot upon one side which allows the sliding plate $d^2$ when pushed inward to engage behind the head of the said stud, which latter is grooved, as at $d^4$, Fig. 3, to receive the edges of the plate forming the sides of the slot. $d^5$, Fig. 4, is a flange at the outer end of the said sliding plate $d^2$ for enabling the said plate to be pulled outward by means of the finger-nail and again pushed inward.

$d^6$ is a hand-strap on the top of the chamber $c$, whereby the apparatus can be conveniently carried.

$e$ is an opening in the removable front $a^5$ of the part $a'$ of the camera-box and designed to receive a suitable lens.

$f$ is the shutter, to be used when taking or exhibiting kinematographic pictures, which shutter is in the form of a half-disk and adapted to be rotated upon a stud $f'$, preferably by helical gear-wheels $f^2$ $f^3$, the wheel $f^3$ being mounted upon a driving-shaft $f^4$ and so proportioned to the wheel $f^2$ that for each rotation of the shaft $f^4$ the shutter will also make one rotation. $f^5$ is another driving-shaft connected to the shaft $f^4$ by the gear-wheels $g$ and $g'$, shaft $g^2$, and gear-wheels $g^3$ $g^4$, the said wheels being so proportioned that for each rotation of the shaft $f^5$ the shutter will make several rotations.

$g^5$ is a crank-handle designed to engage with the ends of either of the shafts $f^4$ or $f^5$ in order that they can be rotated.

$h$ is an opening in the back $h^0$ of the part $a'$ of the camera $a$, between which opening and the opening $e$ the shutter $f$ rotates.

Attached to the part $a^2$ of the camera is a plate $h'$, having an opening $h^2$ corresponding with the opening $h$, the said plate having flanges $h^3$ engaging with corresponding grooves $h^4$ in the back $h^0$ of the part $a'$. This plate $h'$ serves when the two parts of the camera-box are closed as a guide for the film-band and is preferably connected to the part $a^2$ of the camera by a spring connection $h^5$.

$e'$ is an opening in the back of the part $a^2$ of the camera in alinement with the openings $e$, $h$, and $h^2$.

$i$ is a cylindrical film-box designed to be attached to the top of the camera by any suitable means—for instance, by a slotted hole $i'$ in the base of the box and a stud $i^2$ in the top of the movable part $a^2$ of the camera, the said hole and stud being similar to the slotted hole $d^3$ and stud $d$ hereinbefore described.

$i^3$ is a nozzle on the film-box $i$, arranged tangentially therewith and inserted into a slot or recess $i^4$ in the top of the part $a^2$ of the camera and in line with the guide $h'$, so that the film-band can be drawn from the box $i$ through the guide $h'$ by the feed mechanism hereinafter described.

The film-box $i$ is advantageously provided with an arbor or spindle $i^5$, having a slit $i^6$ therein to receive and hold the end of the film-band, the said arbor being rotated by a crank-handle $i^7$ outside the box.

$i^8$ is a cap forming one of the sides of the box $i$ and designed to be removed in order to engage the end of the film-band with the arbor $i^5$.

The feed mechanism comprises a hooked bar $j$, Fig. 3, the point $j'$ of the hooked end of which is designed to engage with holes $j^2$ in the feed-band $j^3$, Fig. 11. The bar $j$ is connected at one end to a frame $k$, sliding in guides $k'$, the said frame being connected by a rod $k^2$ to a crank-disk $k^3$ on the shaft $f^4$, so that as the said shaft is rotated the bar $j$ will be reciprocated. The end $j'$ of the bar $j$ is arranged to project through slots $k^4$ $k^5$ in the plates $h^0$ and $h'$, respectively, and is arranged to be operated by a cam-surface on the crank-disk $k^3$, it being formed springwise, so that it may bear continually on the said cam-surface. The edge of the crank-disk $k^3$ is of the shape indicated in Fig. 3, so that as the bar $j$ is reciprocated it will be alternately projected through the slots $k^4$ and $k^5$ when at the top of its movement to engage with one of the holes in the film-band $j^3$, remaining in engagement so as to draw the band down and then again withdrawn from the band previous to its upward movement to again engage another hole. This arrangement of a single feed-bar necessitates the holes in the film-band being formed along the center thereof, as shown in Fig. 11.

Below the lower end of the guide-plate $h'$ on the part $a^2$ of the camera-box is a slot $l$, through which the film-band is passed after it has been drawn through the said guide $h'$, and in each end of the dark chamber $c$ is formed a corresponding opening $l'$, designed to be closed by a sliding shutter $l^2$, operated from the top of the outside of the dark chamber through the medium of an arm or extension $l^3$.

Each of the compartments $c'$ and $c^2$ of the dark chamber $c$ is provided with openings $m$ and $m'$ in its ends arranged in alinement with the lens of the camera, whereby the object to be photographed can be focused, the said openings being provided, respectively, with sliding shutters $m^2$ and $m^3$, the shutter $m^2$ being operated from the top of the dark chamber through the medium of the arm or extension $m^4$, while the shutter $m^3$ is operated by a pin $m^5$ thereon projecting through a slot in the end of the dark chamber. These shutters are operated to close the openings $m$ $m'$ after the focusing operation is effected, so as to exclude light. If desired, an ordinary view-finder may be applied to the apparatus.

In taking a series of pictures the sensitized film is placed in the film-box $i$ and the part $a^2$ of the camera-box turned on its hinges, so that the end of the film can be drawn through the guide $h'$ and passed through the slot $l$ into either of the compartments $c'$ or $c^2$ which has been placed in position for its reception. The part $a^2$ of the camera-box is then closed and the film-band drawn through the film-guide by rotating the shaft $f^5$ by the handle $g^5$, the said band as it is drawn from the film-box through the guide being pushed into the compartment of the dark chamber $c$. If after the whole of the film in the box $i$ has been passed into the compartment in the dark chamber $c$ the said chamber is taken off the camera and its position reversed and a second film-box placed in position on the top of the apparatus containing another band, the said band can be exposed in a similar manner to that just described.

To remove a film-band which has been exposed in the camera from the compartment of the dark chamber $c$ in the daylight, the end of the band which has been left projecting through the slot $l'$ is passed through the tangential nozzle of the film-box $i$ and engaged with the arbor $i^5$ of the same, the cap $i^8$ being removed to enable this to be effected. The cap is then replaced and the nozzle engaged with the slot $l'$, the film-band being then rewound from the dark chamber into the film-box $i$ and retained therein until it can be taken out in a dark room.

To use my camera for taking single pictures the arrangement of the film-band is the same as that hereinbefore described for taking kinematographic pictures, the operating crank-handle $g^5$, however, being placed upon the shaft $f^4$, so that one revolution of the said handle only produces a movement of the film-band corresponding with one picture. In this arrangement I do not employ the shutter $f$ for determining the exposure of the film, but use a combined time and instantaneous shutter. This shutter is in the form of a disk $q$, Fig. 8, arranged to rotate on its axis on the removable front $a^5$ of the camera. This disk has an opening $q'$, designed to come into alinement with the opening $e$ when exposing the film and is provided with a knob $q^2$ on the outside of the camera, whereby it can be rotated on its axis when setting the shutter, so that the opening $q'$ comes into the position shown by the dotted lines in Fig. 8, the disk being held in this position by a tooth $q^3$ on its edge engaging behind the point of a spring-catch $q^4$ against the tension of a spring $q^5$, one end of which spring is connected to a pin $q^6$ on the disk $q$ and the other to a pin $q^7$ on the front $a^5$ of the camera. $q^8$ is another tooth on the disk $q$, but slightly higher than the tooth $q^3$, as shown in Fig. 4.

For releasing the shutter in order to make a time exposure two studs $p$ $p'$ are employed, passing through the front of the camera-box and each formed with an enlarged head at each end, whereby its movement is limited, the stud $p$, when pressed, forcing the spring-catch $q^4$ out of engagement with the tooth $q^3$, but not sufficient to clear the tooth $q^8$, which therefore comes against the catch and holds the shutter, with its opening $q'$, in alinement with the opening $e$, thus enabling the exposure to be made. When the required time for the exposure has elapsed, the other stud $p'$ must be pressed in, and being designed to impart more movement to the spring-catch $q^4$ than the stud $p$ it releases it from the tooth $q^8$, the shutter then returning to the position shown in Fig. 8 under the tension of the spring $q^5$, a projection $q^9$ on the disk $o$ coming into contact with the pin $q^7$ to determine this position. $r$ is another projection on the disk $q$ to come against the pin $q^7$ to prevent excessive rotation of the disk when setting it.

$s$ is an inclined plane on the disk $q$, which, coming against the under surface of the spring-catch $q^4$ when the disk returns to its normal position, acts as a kind of brake and reduces the shock due to the projection $q^9$ coming into contact with the pin $q^7$.

When making an instantaneous exposure, the disk $q$, after having been set by engaging the tooth $q^3$ with the catch $q^4$, is released by pressing the stud $p'$, which moves the catch back into such a position that the tooth $q^8$ cannot engage with it, the disk therefore moving back to the position shown in Fig. 8, the opening $q'$ moving rapidly over the opening $e$ to expose the film.

When taking kinematographic pictures, it will be obvious that the shutter $q$ will have to be opened—that is to say, so that the opening $q'$ is in alinement with the opening $e$.

Having now particularly described and ascertained the nature of my said invention and in what manner the same is to be performed, I declare that what I claim is—

1. In kinematographic apparatus, the combination with a camera provided with mechanism for moving a film through the focus of a lens and for operating a shutter, of a detachable dark chamber into which the said band after exposure can be introduced the said dark chamber being provided with a partition and adapted at each end to be connected with the camera so that after an exposed band has been completely introduced into one division of the dark chamber, the said dark chamber can be reversed for receiving another band, suitable shutters being provided for closing the apertures through which the band passes into the dark chamber, substantially as described.

2. In a kinematographic camera, the combination of feed mechanism comprising a spring hooked bar adapted to be reciprocated in guides, a crank-shaft connected with the said hooked bar by a rod, the said crank-shaft being extended to the outside of the apparatus and adapted to carry an operating-handle, a cam upon the said shaft designed to press the hook into engagement with the film, a shutter geared with the said crank-shaft and a counter-shaft also geared with the said crank-shaft and extending to the outside of the apparatus, all arranged in such a manner that the shutter may be made to rotate once for each revolution of the operating-handle or several times for each revolution of the said operating-handle according to whether the said handle is applied to the crank-shaft or counter-shaft, substantially as described.

3. In a camera, the combination with means for guiding a film, of a feeding mechanism comprising among its members, a feeding-bar, movable longitudinally and also capable of movement laterally toward and from the film, said feeding-bar being provided with a hook or projection rigidly secured thereto for engaging the film, a cam directly engaging the feeding-bar provided with portions permitting the bar to recede from the film and portions for moving the said bar toward the film, means for holding said feed-bar yieldingly in continuous engagement with the said cam and devices for reciprocating said bar longitudinally, substantially as described.

4. In a camera, the combination with means for guiding a film, of a feeding mechanism therefor, comprising among its members, a longitudinally-movable spring feed-bar, having a hook or projection for engaging the film, a rotary cam having a continuous engagement with said spring feed-bar, said cam being provided with portions for forcing the feed-bar into position to engage the film, and portions permitting said feed-bar to disengage the film, and means for reciprocating said feed-bar, substantially as described.

5. In a camera, the combination with means for guiding a film, of a feeding mechanism therefor comprising among its members, a longitudinally-movable spring feed-bar provided with a hook or projection for engaging the film, a driving-shaft, a cam on said driving-shaft having a continuous engagement with said spring feed-bar and provided with portions for pressing said bar into position to engage the film and portions permitting the feed-bar to move away from the film under the action of its spring to disengage the film, a crank on said driving-shaft and a connection between said crank and said feed-bar for reciprocating said bar, substantially as described.

6. In a camera, the combination with means for guiding a film, of a feeding mechanism therefor comprising a cam, a longitudinally-movable feed-bar having a sliding engagement with said cam, held normally in contact therewith by spring-pressure and provided with means for engaging the film, a crank for imparting a longitudinal reciprocating motion to said bar and a shaft for driving said cam and crank, a shutter operatively connected to said shaft and adapted to be operated simultaneously with said feed-bar, a high-speed mechanism operatively connected with said shaft, and means for driving said shaft directly, independently of said high-speed mechanism whereby the camera can be used for kinematographic pictures or for single pictures, substantially as described.

7. A camera provided with a front section provided with a film-feeding mechanism and shutter, of a rear section adapted to be detachably connected to said front section, provided with a compartment for the reception of an exposed film, an aperture for the admission of the film, a slide for closing said aperture and a detachable holding device for an unexposed film communicating with said front section, substantially as described.

ALFRED DARLING.

Witnesses:
JOHN E. BOUSFIELD,
C. G. REDFERN.